United States Patent [19]

Lance

[11] Patent Number: 6,062,644
[45] Date of Patent: May 16, 2000

[54] SEAT HEADREST

[75] Inventor: Mark Lance, Williamstown, Australia

[73] Assignee: Henderson's Industries Pty. Ltd., Williamstown, Australia

[21] Appl. No.: 09/194,113

[22] PCT Filed: May 26, 1997

[86] PCT No.: PCT/AU97/00325

§ 371 Date: Nov. 23, 1998

§ 102(e) Date: Nov. 23, 1998

[87] PCT Pub. No.: WO97/45290

PCT Pub. Date: Dec. 4, 1997

[30] Foreign Application Priority Data

May 29, 1996 [AU] Australia .................................. PO0124

[51] Int. Cl.[7] .................................. A47C 7/38; B60N 2/48
[52] U.S. Cl. ................................................. 297/410
[58] Field of Search ................................ 297/391, 410, 297/408

[56] References Cited

U.S. PATENT DOCUMENTS

| 5,110,185 | 5/1992 | Schmutz et al. | 297/410 |
| 5,131,720 | 7/1992 | Nemoto | 297/410 |
| 5,222,784 | 6/1993 | Hamelin | 297/410 X |
| 5,330,228 | 7/1994 | Krebs et al. | 297/483 X |
| 5,433,508 | 7/1995 | Akima et al. | 297/410 |
| 5,836,651 | 11/1998 | Szerdahelyi et al. | 297/410 |

FOREIGN PATENT DOCUMENTS

| 497705 | 8/1992 | European Pat. Off. . | |
| 62-125935 | 6/1987 | Japan | 297/410 |
| 2234167 | 1/1991 | United Kingdom . | |

*Primary Examiner*—Peter R. Brown

[57] ABSTRACT

A seat headrest assembly including a headrest (1) mounted on at least one support post (3) which is connectable to a seat backrest (2). The headrest (1) is mounted on the support post (3) so as to be movable relative thereto in the longitudinal direction of the post (3). Electrically powered drive mechanism (18) including a motor (15) is contained within the headrest (1). A screw threaded spindle (19) is drivably connected to the motor (15) through a worm drive (18) and cooperatively engages with a nut (20) attached to the post (3). The arrangement is such that rotation of the spindle (19) causes the headrest (1) to move along the post (3). A source or electrical power is connectable to the motor (15) through an electric conductor which is provided on or is formed by the support post (3).

16 Claims, 7 Drawing Sheets

SEAT HEADREST

This application is the national phase under 35 U.S.C. §371 of prior PCT International Application No. PCT/AU97/00325 which has an International filing date of May 26, 1997 which designated the United States of America.

This invention relates to seat headrests and particularly such headrests which are adjustable so as to alter the position of elevation relative to the seat base. It will be convenient to hereinafter describe the invention with particular reference to vehicle seats, but it is to be understood that the invention has wider application.

Variation in the elevation of an adjustable headrest may be achieved manually or by drive means connected to an appropriate power source. Vehicle manufacturers sometimes offer power driven headrests as an option, in which event the seat assembly must be able to accept either a manually adjustable headrest or a power driven headrest, or it must be adaptable to permit adoption of either of those forms of headrest.

In the case of power driven headrests it is quite common to locate the drive system within the seat backrest. It is therefore necessary for the vehicle manufacturer to provide different seat backrests for the manually adjustable headrest and the power driven headrest options respectively, and that naturally adds to the cost of vehicle manufacture. There is also the difficulty of hiding unsightly power leads in the power driven headrest option, and that generally requires the provision of cosmetic covers which again add to the manufacturing cost.

It is an object of the present invention to provide an improved power driven headrest system which is of relatively simple form and which overcomes or minimises the problems referred to above. It is a further object of the invention to provide a power driven headrest which can be associated with the same seat backrest as that used for a manually adjustable headrest system. It is yet another object of the invention to provide a relatively simple electrically powered headrest adjustment system.

Adjustable headrests are commonly connected to the seat backrest through at least one support post. A headrest adjusting system according to the invention is characterised in that the support post, or at least part of that post, forms or carries an electrical conductor through which power from a battery or other power source is connected to the drive mechanism for the headrest. It will usually be the case that the drive mechanism includes a motor which must be connected to the power source in order to energise the drive mechanism. In such an arrangement the headrest support post will form part of the electrical circuit between the power source and the motor. In a preferred arrangement the headrest is supported by two posts and each forms a respective part of the electrical circuit.

The drive mechanism of the adjustment system may be contained within the headrest rather than the backrest as in some of the prior arrangements. Containment of the drive mechanism in the headrest maximises the possibility of using the same seat backrest with either a manually adjustable headrest or a power driven headrest. In addition it avoids difficulties which can be encountered in attempting to locate the drive mechanism in the limited space available in some backrests. One of the most convenient locations for the mechanism within the backrest needs to be resilient for user comfort, but manufacturers are sometimes driven to place the mechanism in that location and thereby reduce resilience and user comfort because a more acceptable option is not available.

It is preferred that the drive mechanism includes a rotatable screw threaded spindle which is drivably connected to the electric motor. Both the motor and the spindle may be mounted on a base of the headrest, and the spindle is preferably arranged to extend generally in the axial direction of the support post. The drive connection between the spindle and the motor is preferably formed by a worm drive which is also mounted on the headrest base. With such an arrangement adjustment of the headrest elevation is achieved by rotation of the spindle within a cooperative screw threaded nut which is secured to the support post against movement relative thereto.

According to a further aspect of the invention there is provided a seat sub-assembly including a headrest, at least one support post, means mounting said headrest on said post for movement relative thereto in the axial direction of the post, electrically powered drive means mounted within said headrest and being operable to cause said movement of the headrest relative to said post, and an electrical conductor provided on or formed by said post and through which a source of electrical power is connected to said drive means to thereby render said drive means operative.

According to yet another aspect of the invention there is provided a method of forming a sub-assembly of the foregoing kind, including the steps of, providing padding on a hollow housing of said headrest, side of that housing, said housing having a laterally outwardly projecting flange at a lower open side thereof, providing a sheet material cover over said padding, said cover having trim flaps adjacent said open side, mounting said drive means on a base, inserting said drive means into said housing through the lower open side thereof, and folding said trim flaps inwardly so that each is secured between opposed surfaces of said flange and said base respectively.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

IN THE DRAWINGS

Figure 1:
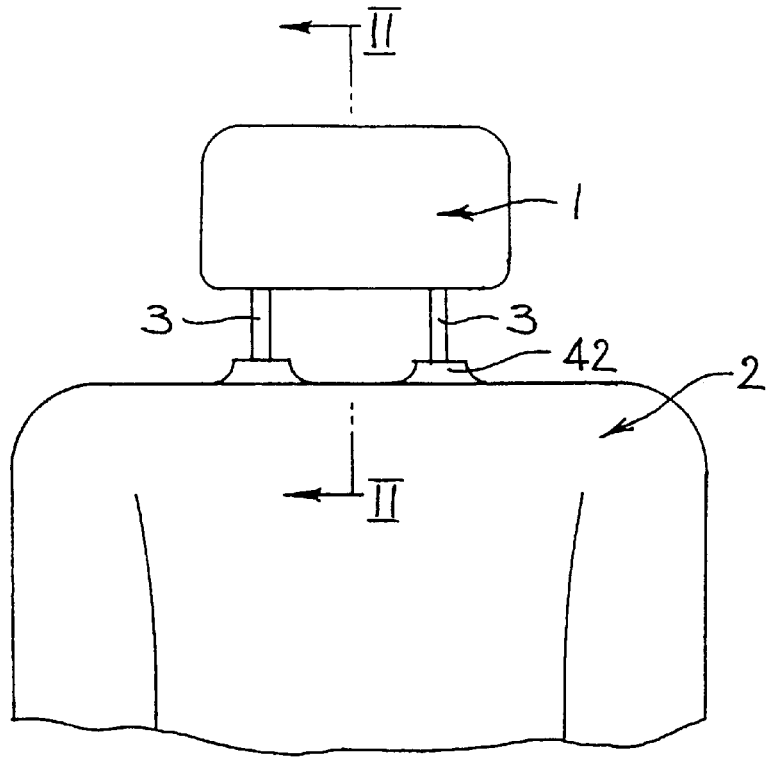
FIG. 1 is a diagrammatic illustration of the upper portion of a seat backrest to which is attached a headrest.
Figure 2:
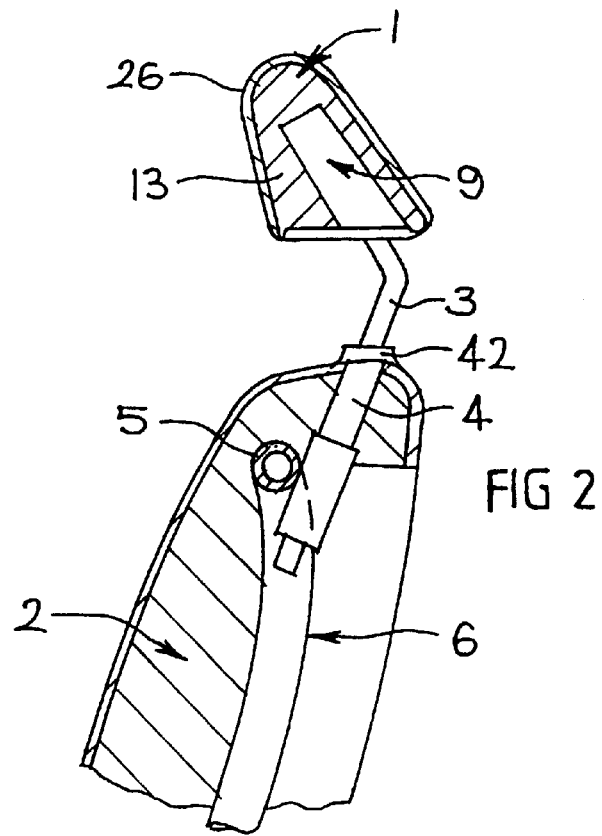
FIG. 2 is a cross-section view taken along line II—II of FIG. 1.

FIG. 1 illustrates in diagrammatic form a typical vehicle seat assembly including a headrest 1 connected to a backrest 2 through two laterally spaced support posts 3. A single post rather than two posts may be used in other arrangements. Each post 3 extends into and through a tubular pole guide 4 (FIG. 2) which, in the arrangement shown, is attached to a cross member 5 of the seat backrest frame 6. It is normally the case that the headrest 1 can be completely removed from the backrest 2 by sliding the posts 3 out of their respective guides 4, and that may require release of post retaining means (not shown).

Figure 3:
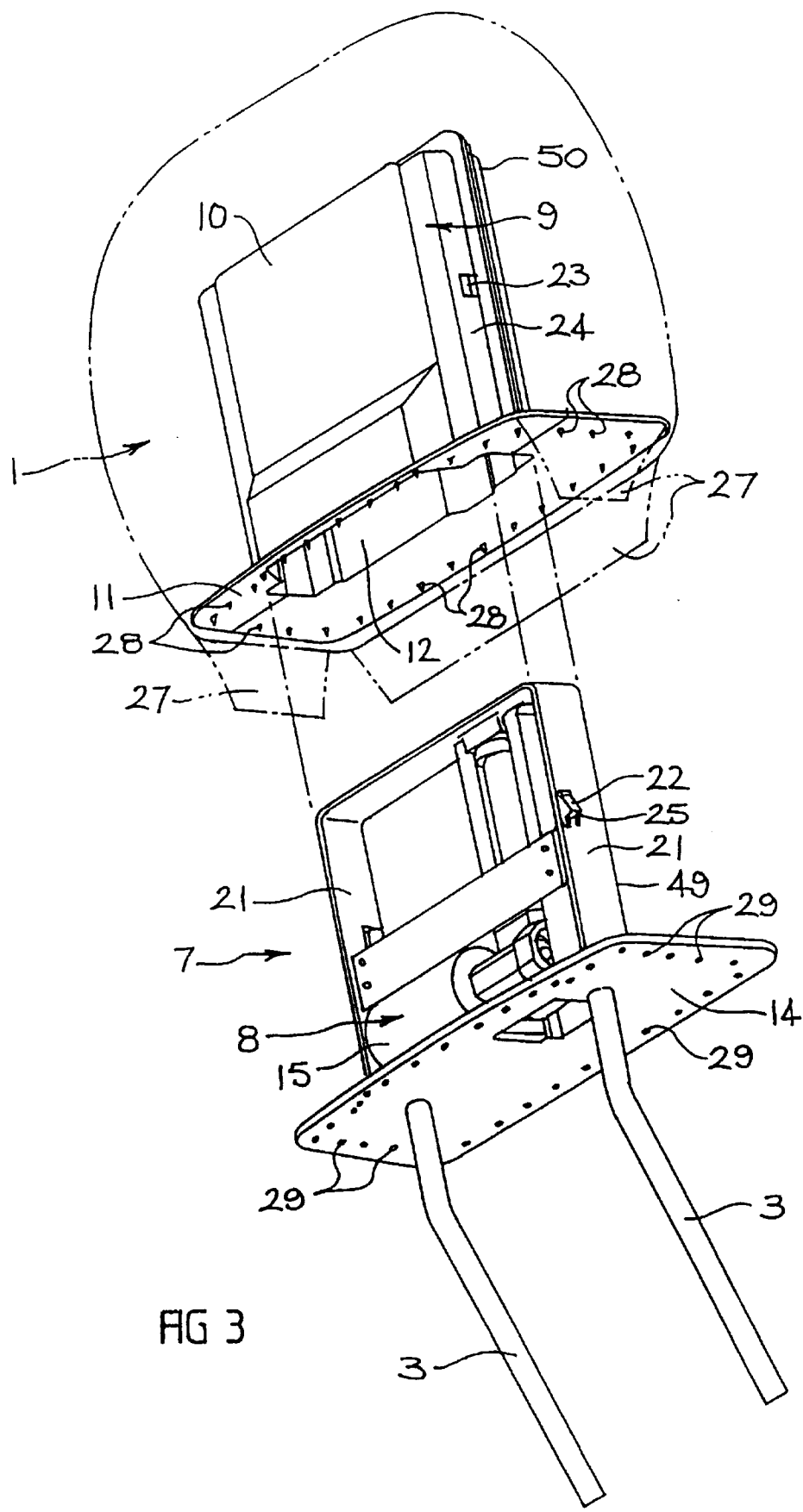
FIG. 3 is an exploded perspective view of a headrest assembly according to one embodiment of the invention.

An example headrest assembly is shown by FIG. 3 and includes two sub-assemblies one of which comprises the headrest 1 and the other sub-assembly 7 includes the headrest drive mechanism 8 and the support posts 3. It is to be understood that other arrangements could be adopted, but the arrangement shown has been found to be particularly satisfactory because of its relative simplicity and convenience of assembly.

The sub-assembly comprising the headrest 1 includes a housing 9 for the drive mechanism 8, and in the arrangement shown that housing 9 includes a hollow body 10 and a laterally projecting flange 11 surrounding an opening 12 at a lower side of the body 10. It will generally be convenient to mould the headrest padding 13 (FIG. 2) directly onto the housing 9 so that the padding 13 is bonded to the housing 9.

Figure 4:
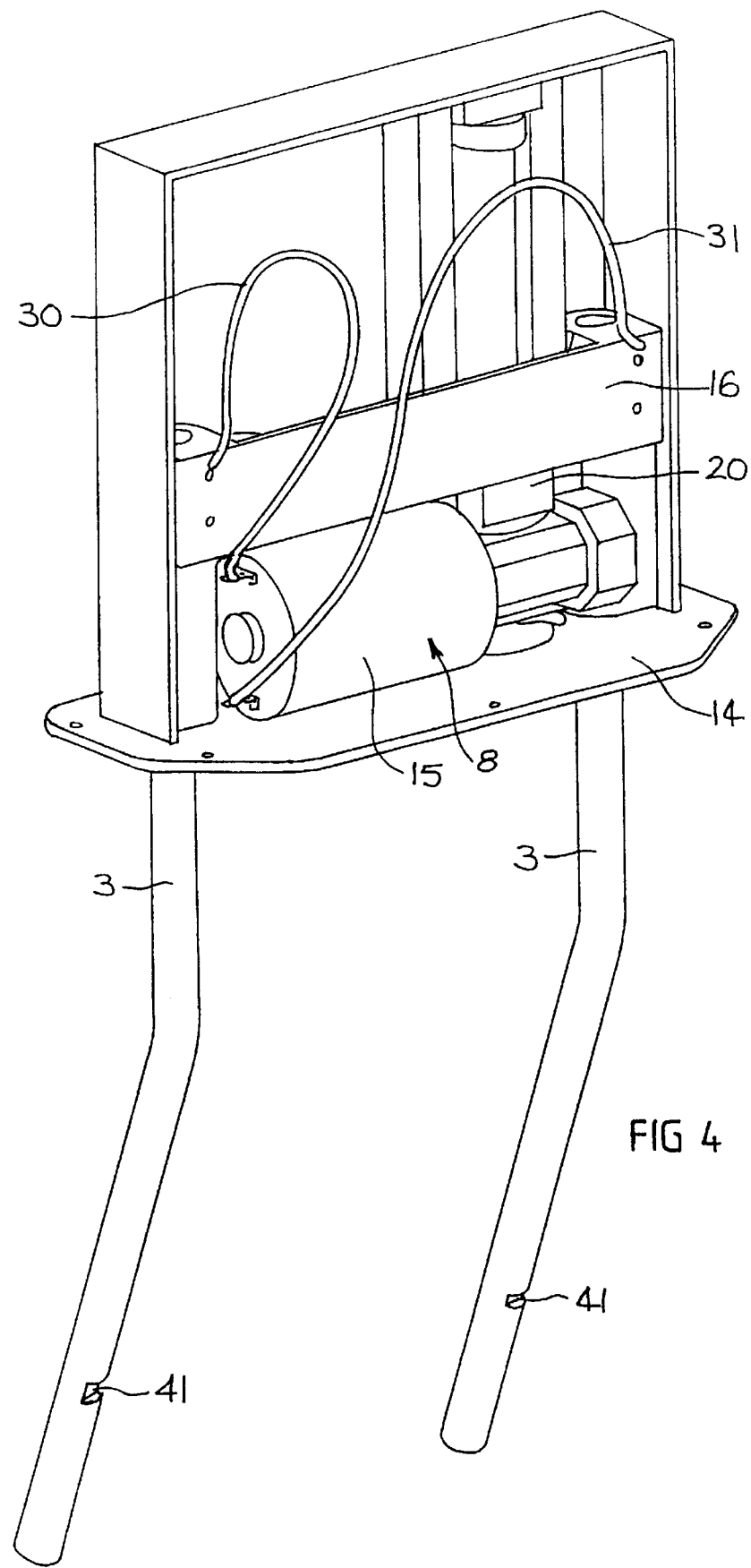
FIG. 4 is a perspective view of one part of the assembly shown in FIG. 3 and which shows the headrest sub-assembly at an elevated position relative to the support posts on which the headrest is mounted.
Figure 5:
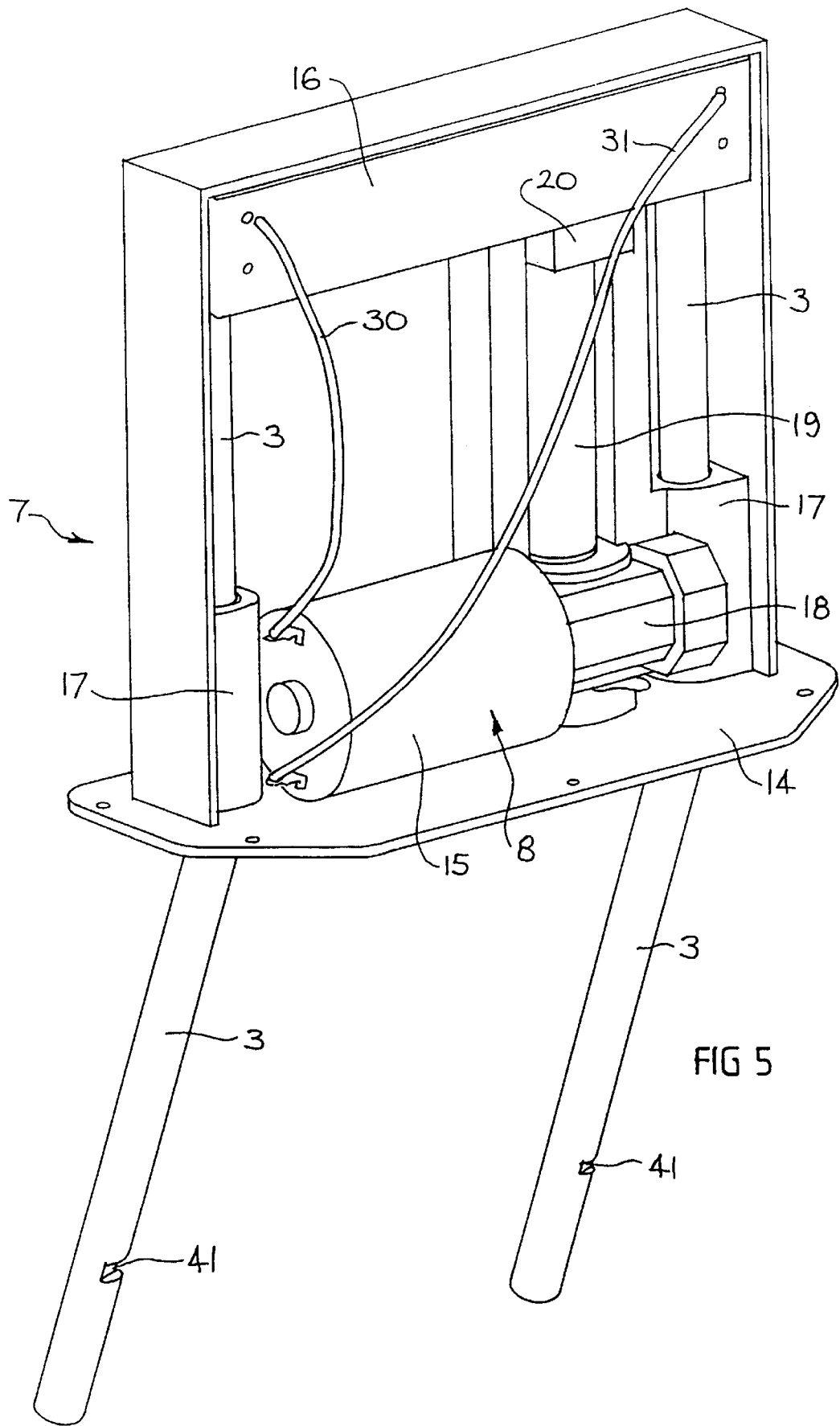
FIG. 5 is a view similar to FIG. 4 but showing the headrest sub-assembly in a lowered position.

In the particular arrangement shown the sub-assembly 7 includes a base plate 14 on which the drive mechanism 8 is mounted. As best seen in FIGS. 4 and 5 the drive mechanism 8 includes a motor 15 drivably connected to a cross bar 16 which is attached to an upper end of each of the posts 3. Each post 3 is slidably located in a respective one of two guide blocks 17 mounted on the base plate 14 or formed integral with that plate. The drive connection between the motor 15 and the cross bar 16 can be of any suitable form, but in the arrangement shown includes a worm drive 18 connected to an upright screw threaded spindle 19 which is rotatable within a correspondingly threaded travelling nut 20. The nut 20 is attached to or formed integral with the cross bar 16 so as to be held against rotation with the spindle 19 and moves up and down relative to the base plate 14 in response to rotation of the spindle 19. Because of the attachment of the cross bar 16 to both the nut 20 and the posts 3 such movement of the nut 20 causes the base plate 14 to be moved relative to the posts 3 between two extreme positions as shown by FIGS. 4 and 5 respectively.

The headrest assembly is created by moving the drive mechanism 8 through the opening 12 of the housing body 10 so as to locate within the interior of the body 10. Any suitable means may be employed to retain the drive mechanism 8 within the body 10, and in the arrangement shown a releasable detent system is used for that purpose. As shown in FIG. 3 each of two side plates 21 connected to or formed integral with the base plate 14 carries a detent 22 which is resiliently mounted so as to be movable relative to the respective plate 21. When the drive mechanism is fully and correctly located within the body 10 each detent 22 snap engages within a respective opening 23 formed in a side wall 24 of the body 10. An abrupt lower surface 25 of each detent 22 engages an edge of the respective opening 23 so as to prevent separation of the sub-assembly 7 and the headrest 1. Such separation is possible by pressing each detent 22 inwards towards the other so as to be released from engagement with the aforementioned edge of the respective opening 23.

As an alternative to the arrangement particularly described, blind internal recesses may be used instead of the through openings 23. That is, each detent 22 may be engageable within a recess formed within the inner surface of the respective adjacent side plate 21. Such an arrangement makes it convenient to mould the headrest padding 13 directly onto the housing 9.

In the preferred arrangement shown by FIG. 3 the sheet material cover 26 (FIG. 2) of the headrest 1 is provided with trim flaps 27 which are generally disposed as shown by FIG. 3 before the sub-assembly 7 is attached to the headrest 1. During the final stages of that attachment the flaps 27 are caused to be sandwiched between opposed surfaces of the flange 11 and the base plate 14 respectively. As a result, trimming of the headrest 1 occurs automatically and in a manner more convenient than previous trimming methods such as sewing, gluing or otherwise fastening the trim flaps in place.

It is preferred that the arrangement described includes retention means for positively retaining the flaps 27 against removal from their confinement between the flange 11 and the base plate 14. In the arrangement shown that retention means includes a series of teeth 28 provided on the flange 11 and a corresponding series of holes 29 or recesses provided in the base plate 14. Each tooth 28 is adapted to penetrate into or through the associated flap 27 and locate within a respective one of the holes 29 when the drive mechanism 8 is snapped into engagement with the housing 9 and in that way positively lock the associated flap 27 in position. It will be appreciated that the relative positions of the teeth 28 and the holes 29 could be reversed so that they are provided on the base plate 14 and the flange 11 respectively, but the arrangement shown and described above is preferred.

Retention means different to that described above could be adopted. By way of example, instead of using holes 29 as described, the part of the retention means associated with the base plate 14 could include a recess, or a series of recesses, formed in the upper surface of the plate 14. In one such arrangement a continuous groove formed in that surface is positioned and dimensioned to receive each of the teeth 28 as well as sections of sheet material engaged by those teeth. Still further, a rib or a series of ribs could be substituted for the teeth 28 and arranged to cooperate with the recess or recesses as referred to above.

In accordance with the invention each of the posts 3, or a part of each such post, is made of metal or another electrically conductive material so as to form a conductor in the electrical circuit between the motor 15 and the vehicle battery or other power source. Power leads 30 and 31 as shown in FIGS. 4 and 5 connect the motor 15 to each of the posts 3, or at least to the electrically conductive part of each of the posts 3. The power to energise the motor 15 is conveyed through the conductive part of each post 3 and for that purpose it is preferred that a lower section of each post 3 is in electrically conductive contact with another section of the motor power circuit.

Figure 6:
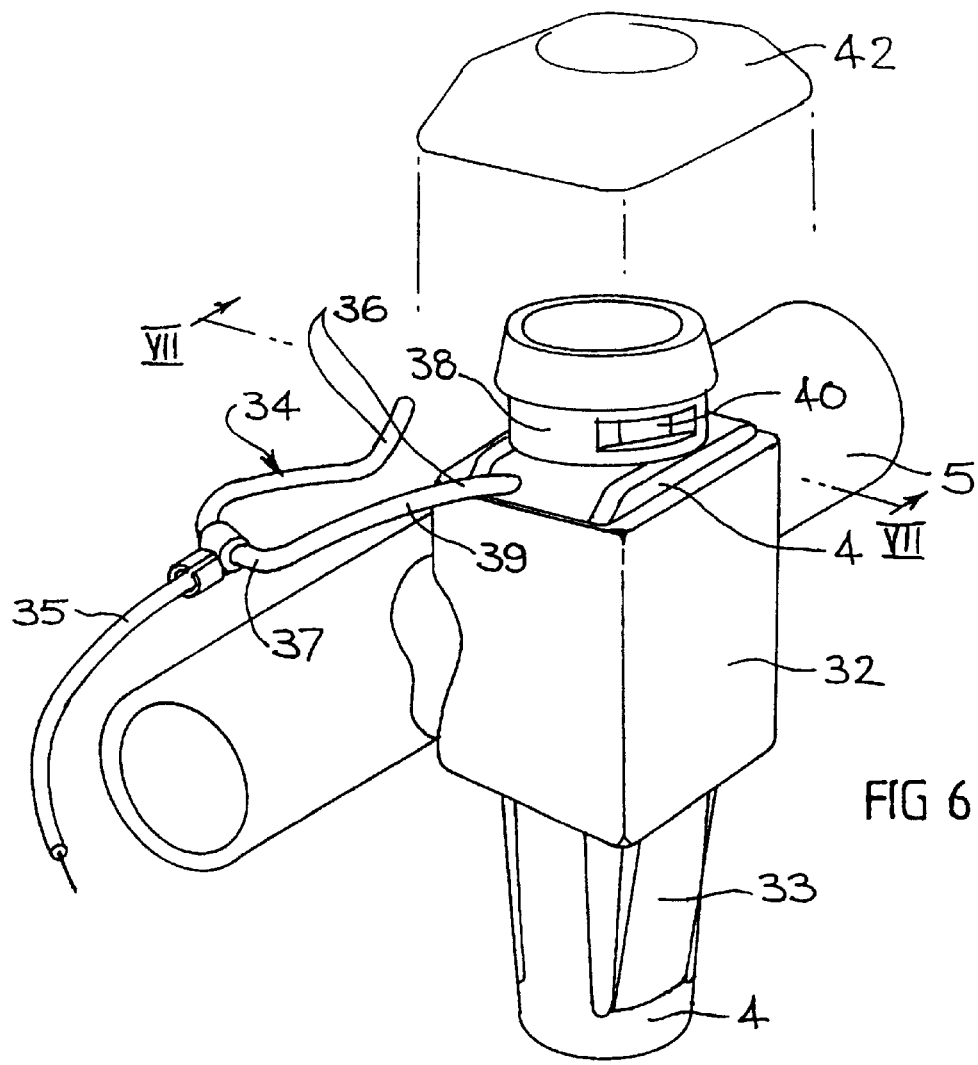
FIG. 6 is a perspective view of one arrangement for attaching a headrest support post to the frame of a seat backrest.

FIG. 6 shows one arrangement for achieving the aforementioned contact. In that arrangement the post guide 4 is attached to a tubular mounting member 32 secured to the seat frame cross member 5. The guide 4 can be releasably retained in that attached condition in any suitable manner such as by use of a resiliently mounted retainer lug 33 as shown and release movement of the lug 33 may be prevented by the post 3 when it is located within the guide 4. Electrical contact with the associated post 3 is made at or adjacent the guide 4, and that contact can be achieved in various ways.

It will usually be the case that the guide 4 is formed of electrically non-conductive material.

It is possible that contact means for the aforementioned purpose can also serve to retain, or assist retention of, the associated post 3 in position within the guide 4, and FIG. 6 illustrates one such arrangement. In the FIG. 6 arrangement a metal spring clip 34 forms the contact means and is in electrically conductive communication with a power lead 35. The spring clip 34 has two spaced legs 36 connected at one end through a resilient bight portion 37.

Figure 7:
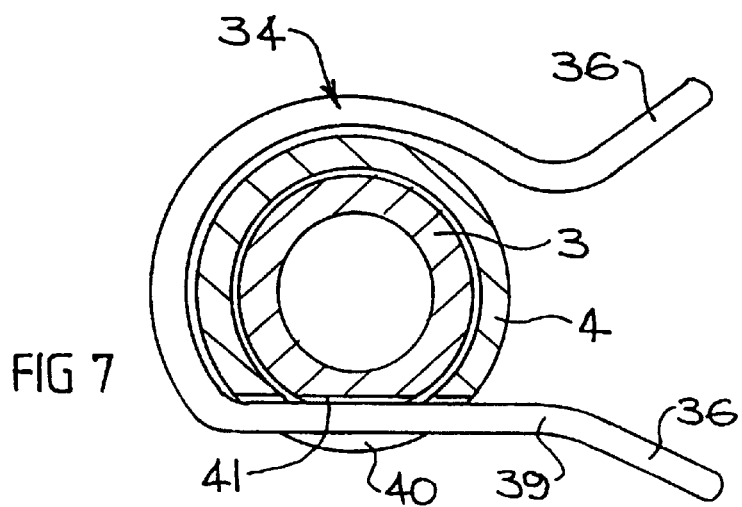
FIG. 7 is a cross-sectional view taken along line VII—VII of FIG. 6 and showing a headrest support post attached to the seat backrest frame.

The legs 36 of the clip 34 can be spread apart sufficiently to pass on opposite sides of a neck portion 38 of the guide 4, and a part 39 of one leg 36 is thereby able to locate in and protrude through a slot 40 formed through the wall of the neck portion 38 as best seen in FIG. 7. The leg part 39 engages within a transverse groove 41 formed in the post 3 and thereby holds the post 3 against removal from the guide 4. The resilient nature of the clip 34 causes the leg part 39 to engage firmly with the post 3 such as to enable the conduction of an electrical current between the clip 34 and the post 3.

A trim cap 42 (FIG. 6) can be employed to locate over the upper end of the guide 4 such as to hide the clip 34 and the attached power lead 35. The power lead 35 can follow any appropriate path through the backrest 2, or a member associated with the backrest 2, so as to be connected with the power source.

Figure 8:
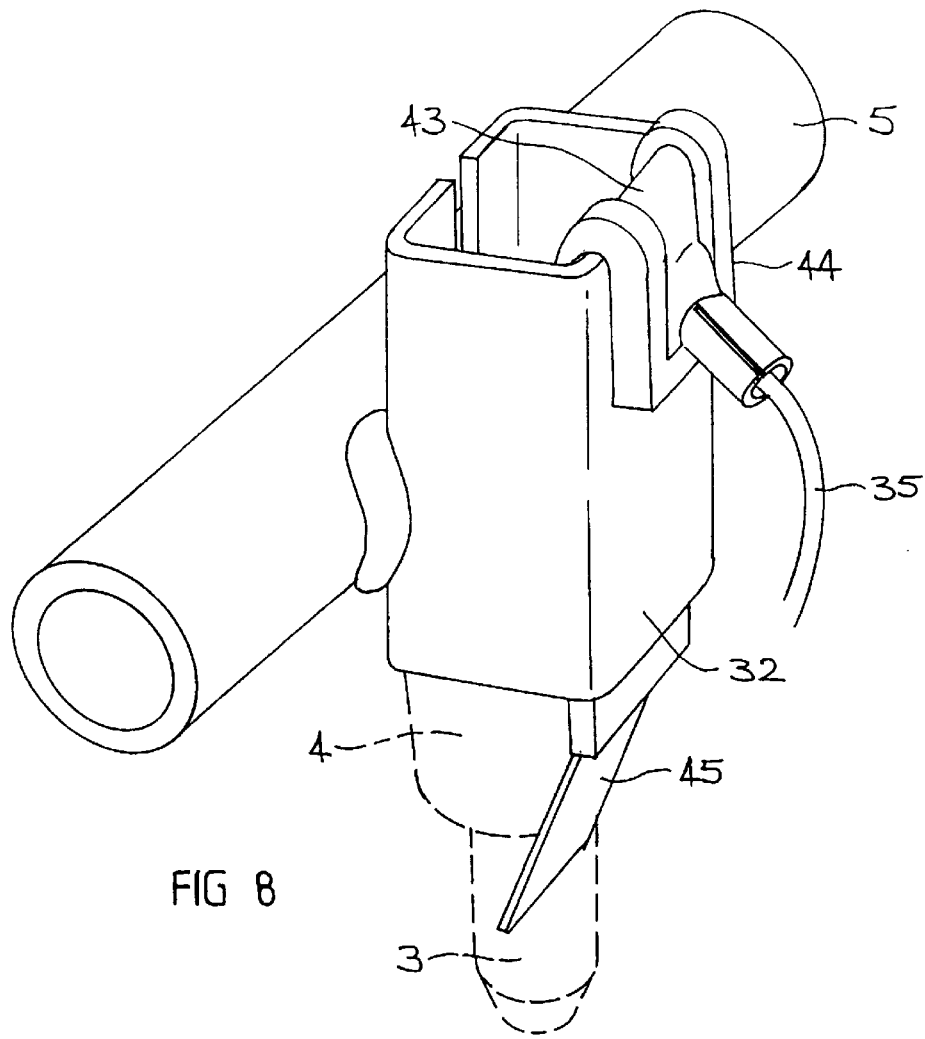
FIG. 8 is a view similar to FIG. 6 but showing another embodiment of the invention.

FIG. 8 shows an alternative to the arrangement shown by FIG. 6. In the FIG. 8 arrangement a contact plate 43 is attached to the mounting member 32 through an attaching clip 44. If the mounting member 32 is made of metal or other electrically conductive material it is preferred that the attaching clip 44 is formed of an electrically non-conductive material. The power lead 35 is connected to the plate 43 as shown, and the plate 43 is arranged so as to make electrically conductive contact with the post 3. That contact may be achieved through a part 45 which forms an extension of the plate 43 and which is resiliently urged inwards towards the axis of the post 3 so as to make firm contact with the post 3. If desired, the part 45 could be arranged to locate within the post groove 41 and thereby perform the dual function of retaining the post 3 in position, but it is preferred that the post retainer function is effected by means specifically designed for that purpose.

Figure 9:
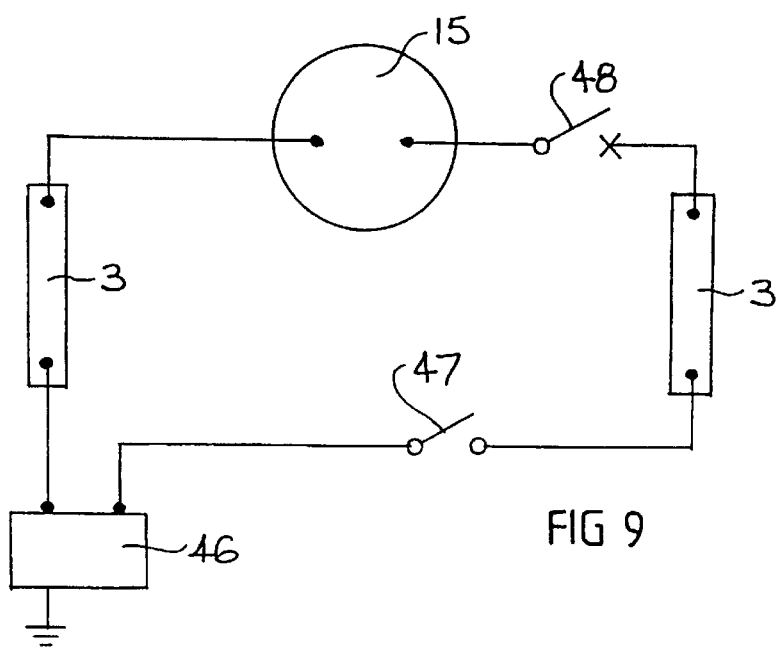
FIG. 9 is a circuit diagram according to one embodiment of the invention.

An example electrical circuit for the motor 15 is shown by FIG. 9. In that particular circuit the power source is formed by the vehicle battery 46 and a manually operable switch 47 enables the battery 46 to be connected to or disconnected from the motor 15. It is preferred that a circuit breaker 48 is also provided in the circuit so as to be operable to automatically disconnect the battery 46 from the motor 15 if a short circuit or power overload occurs within the circuit. The circuit breaker 48 may be operable to automatically reset to a battery connect condition when the short circuit or overload condition is removed.

Use of a circuit breaker 48 could avoid the need to electrically insulate that part of each post 3 which is exposed between the headrest 1 and the backrest 2, but appropriate insulating means could be adopted if desired. Also, the position of the circuit breaker 48 need not be as shown by FIG. 9, but it could be located at any other appropriate position within the circuit.

Figure 10:
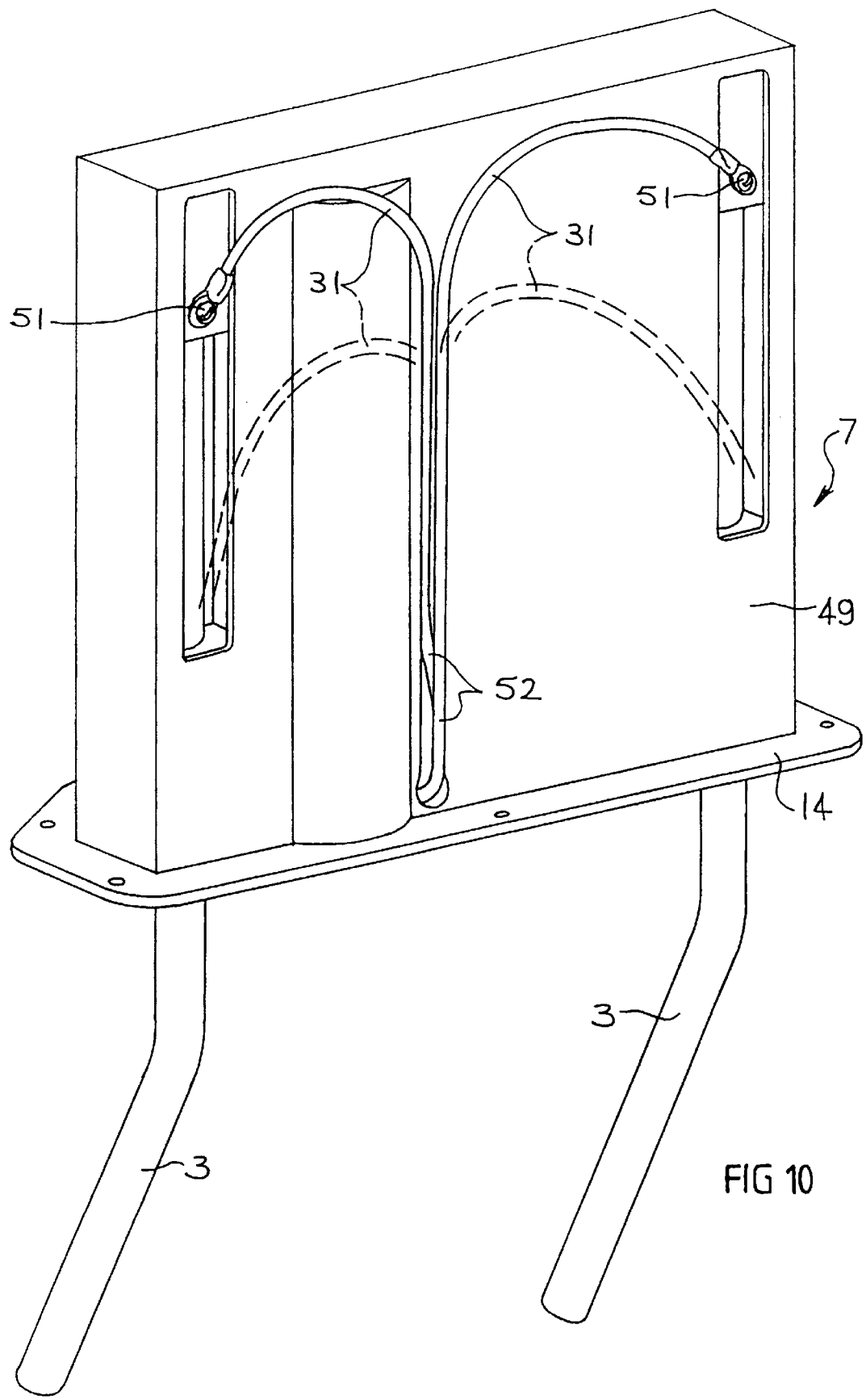
FIG. 10 is a view similar to FIG. 5 but showing the headrest sub-assembly from the side opposite to that shown by FIG. 5.

As will be evident from FIGS. 4 and 5 the power leads 30 and 31 are caused to flex during movement of the headrest 1 between the positions of minimum and maximum elevation. It is therefore desirable to guard against the leads 30 and 31 becoming entangled with the drive mechanism 8 or other exposed parts of the sub-assembly 7. FIG. 10 illustrates an example arrangement for avoiding such entanglement.

FIG. 10 is a view similar to FIG. 5 but shows the sub-assembly 7 from the side opposite to that shown by FIG. 5. The power leads 30 and 31 are disposed to be contained within a cavity (not shown) formed between the wall 49 of the sub-assembly 7 and an opposed wall 50 (FIG. 3) of the housing 9. The power leads 30 and 31 are thereby kept clear of the drive mechanism 8. It will be apparent that other arrangements could be adopted to achieve the same result.

Each of the cable ends 51 shown in FIG. 10 is connected to a respective one of the posts 3 so as to be in electrically conductive contact with that post 3, and each of the cable ends 52 shown in FIG. 10 is connected to a respective one of the positive and negative terminals of the motor 15.

It will be appreciated from the foregoing that the present invention provides a convenient and effective system for enabling adoption of either manual or powered adjustment of a seat headrest. The system enables both the headrest and backrest to be fully trimmed whilst nevertheless permitting selection of either the manual or powered options.

Various alterations, modifications and/or additions may be introduced into the constructions and arrangements of parts previously described without departing from the spirit or ambit of the invention as defined by the appended claims.

I claim:

1. A seat including, a backrest, a headrest, at least one support post connecting said headrest to said backrest, said headrest being movable relative to said backrest so as to vary the position of said headrest relative to an upper side of said backrest, electrically powered drive means connected to said headrest, and being operable to cause said relative movement of the headrest, and an electrical conductor provided on or formed by said post and through which a source of electrical power is connected to said drive means to thereby render said drive means operative, wherein said electrical conductor forms an integral part of said post.

2. A seat according to claim 1, wherein said post is connected to said backrest so as to extend upwards beyond said upper side, and said headrest is mounted on said post so as to be movable relative thereto in the longitudinal direction of the post and thereby vary said position of the headrest.

3. A seat according to claim 2, wherein said headrest includes a base member slidably mounted on said post to enable said relative movement of the headrest.

4. A seat according to claim 3, wherein said drive means includes an electric motor and a rotatable screw threaded spindle drivably connected to said motor, both said motor and said spindle being mounted on said base member for movement therewith relative to said post, and said spindle being arranged to extend generally in the axial direction of said post.

5. A seat according to claim 4, wherein said spindle is drivably connected to said motor through a worm drive which is mounted on said base member.

6. A seat according to claim 4, wherein said spindle cooperatively engages with a screw threaded nut which is secured to said post against movement relative thereto, and said backrest position varies in response to rotation of said spindle relative to said nut.

7. A seat according to claim 3, wherein said headrest includes a housing which contains said drive means, and resilient padding located over at least a substantial part of said housing.

8. A seat according to claim 7, wherein a lower side of said housing is open and said base member at least substantially closes that lower side.

9. A seat according to claim 7, wherein said drive means forms part of a headrest sub-assembly which is releasably attached to said housing.

10. A seat according to claim 1, wherein said post is connected to said backrest by slidable location within a guide attached to a frame part of said backrest, and retaining means is operative to releasably restrain said post against removal from said guide.

11. A seat according to claim 1, including two said posts each of which includes a said electrical conductor.

12. A seat including, a backrest, a headrest, at least one support post connecting said headrest to said backrest, said headrest being movable relative to said backrest so as to vary the position of said headrest relative to an upper side of said backrest, electrically powered drive means connected to said headrest and being operable to cause said relative movement of the headrest, and an electrical conductor which forms an integral part of said post and through which a source of electrical power is connected to said drive means to thereby render said drive means operative, wherein said drive means is connected to said conductor at an upper end portion of said post, and a lower portion of said post being connected in electrically conductive relationship with a circuit connected to or including said power source.

13. A seat including, a backrest, a headrest, at least one support post connecting said headrest to said headrest to said backrest, said headrest being movable relative to said backrest so as to vary the position of said headrest relative to an upper side of said backrest, electrically powered drive means connected to said headrest and being operable to cause said relative movement of the headrest, and an electrical conductor which forms an integral part of said post and through which a source of electrical power is connected to said drive means to thereby render said drive means operative, wherein said drive means is connected to said conductor at an upper end portion of said post, and a lower portion of said post is connected in electrically conductive relationship with a circuit connected to or including said power source, wherein said post is connected to said backrest by slidable location within a guide attachable to a frame part of said backrest, and retaining means is operative to releasably restrain said post against removal from said guide, and wherein said retaining means included a spring clip which coacts with both said post and said guide and said circuit is connected to said conductor through said clip and the connection of said clip with said post.

14. A set sub-assembly including a headrest, at least one support post, means mounting said headrest on said post for movement relative thereto in the axial direction of the post, electrically powered drive means mounted within said headrest and being operable to cause said movement of the headrest relative to said post, and an electrical conductor which forms an integral part of said post and through which a source of electrical power is connected to said drive means to thereby render said drive means operative.

15. A method of forms a seat sub-assembly which includes a headrest, at least one support post, means mounting said headrest on said post for movement relative thereto in the axial direction of the post, electrically powered drive means mounted within said headrest and being operable to cause said movement of the headrest relative to said post, and an electrical conductor which forms an integral part of said post and through which a source of electrical power is connected to said drive means to thereby render said drive means operative; wherein said method includes the step of, providing padding on a hollow housing of said headrest, said housing having a laterally outwardly projecting flange at a lower open side thereof, providing a sheet material cover over said padding, said cover having trim flaps adjacent said open side, mounting said drive means on a base, inserting said drive means into said housing through the lower open side thereof, and folding said trim flaps inwardly so that each is secured between opposed surfaces of said flange and said base respectively.

16. A method according to claim 15, wherein said base is attached to said housing by releasable detent means.

* * * * *